(12) United States Patent
Runde (10) Patent No.: US 8,449,029 B2
(45) Date of Patent: May 28, 2013

(54) SINGLE SLOT LIFT AND ROTATE MECHANISM

(75) Inventor: David M. Runde, Beverly Hills, MI (US)

(73) Assignee: Magna Seating Inc., Newmarket, Ontario (CA)

( * ) Notice: Subject to any disclaimer, the term of this patent is extended or adjusted under 35 U.S.C. 154(b) by 84 days.

(21) Appl. No.: 13/255,247

(22) PCT Filed: Feb. 26, 2010

(86) PCT No.: PCT/CA2010/000289
§ 371 (c)(1),
(2), (4) Date: Sep. 8, 2011

(87) PCT Pub. No.: WO2010/102381
PCT Pub. Date: Sep. 16, 2010

(65) Prior Publication Data
US 2011/0316310 A1    Dec. 29, 2011

Related U.S. Application Data

(60) Provisional application No. 61/159,535, filed on Mar. 12, 2009.

(51) Int. Cl.
*B60N 2/46*    (2006.01)
(52) U.S. Cl.
USPC ........................................ 297/113; 297/411.32
(58) Field of Classification Search
USPC ......... 297/14, 112, 113, 238, 411.32, 411.35, 297/411.33, 411.38, 357, 378.1
See application file for complete search history.

(56) References Cited

U.S. PATENT DOCUMENTS

| 1,466,039 | A |   | 8/1923  | Burcsak |
|-----------|---|---|---------|---------|
| 1,835,947 | A | * | 12/1931 | Johannsen ..................... 297/113 |
| 2,824,599 | A | * | 2/1958  | Quinlan ........................ 297/146 |
| 2,867,839 | A | * | 1/1959  | Squire ............................. 16/358 |
| 3,076,628 | A | * | 2/1963  | Smith et al. ................... 248/586 |
| 3,191,995 | A | * | 6/1965  | Shelton .................... 297/411.33 |
| 3,363,942 | A |   | 1/1968  | Fletcher |
| 5,096,256 | A | * | 3/1992  | Mouri ........................... 297/113 |
| 5,433,503 | A |   | 7/1995  | De Filippo |
| 5,547,257 | A | * | 8/1996  | Lavender ................. 297/411.32 |

(Continued)

FOREIGN PATENT DOCUMENTS

| DE | 3505399       | * | 8/1986  |
| WO | WO2008/104348 | * | 9/2008  |
| WO | 2008141440    |   | 11/2008 |

*Primary Examiner* — David Dunn
*Assistant Examiner* — Richard Lowry
(74) *Attorney, Agent, or Firm* — Miller Canfield (57) ABSTRACT

An armrest is movable between a stowed position disposed within a recess of a seat back and deployed position extending from the recess. A bracket fixedly secured to the seat back includes a slot having an angled portion connected with a vertical portion, which is connected with an arcuate portion. First and second pins extend laterally from a proximal end of the armrest and are pivotally and slidably coupled to the slot. The first pin travels along the angled portion and the second pin travels along the vertical portion in response to pivotal movement of the armrest, thereby lifting the armrest to prevent interference between the proximal end of the armrest and the seat back. The first pin remains at the transition between the angled portion and the vertical portion and the second pin travels along the arcuate portion in response to further pivotal movement of the armrest.

17 Claims, 8 Drawing Sheets

U.S. PATENT DOCUMENTS

| | | | |
|---|---|---|---|
| 5,603,682 A * | 2/1997 | Grider | 482/142 |
| 5,752,739 A * | 5/1998 | Saeki | 297/113 |
| 5,947,554 A * | 9/1999 | Mashkevich | 297/115 |
| 6,328,384 B1 * | 12/2001 | Yamauchi et al. | 297/411.29 |
| 2008/0315658 A1 * | 12/2008 | Knapp | 297/411.38 |
| 2010/0148561 A1 * | 6/2010 | Runde | 297/411.33 |
| 2011/0080026 A1 * | 4/2011 | Szegeny et al. | 297/232 |

\* cited by examiner

SINGLE SLOT LIFT AND ROTATE MECHANISM

BACKGROUND OF THE INVENTION

1. Field of the Invention

The present invention relates to a center armrest for a bench-type seat assembly of an automotive vehicle. More particularly, the present invention relates to a center armrest that utilizes a bracket with a single slot for moving the armrest between a stowed position and a deployed position.

2. Description of Related Art

A bench-type seat assembly for an automotive vehicle having a seat back and a seat cushion will oftentimes include a center armrest for seat occupant comfort. Typically, the armrest is pivotally coupled at a fixed pivot between a proximal end of the armrest and the seat back. The armrest pivots between a stowed or non-use position and a deployed or use position by rotating the armrest about the fixed pivot. In the stowed position, the armrest is in a generally vertical position with the armrest fitted into a recess in the seat back to form a flush seat back surface. In the deployed position, the armrest is in a generally horizontal position at approximately elbow height for the seat occupant. In operation, the armrest will be rotated by the occupant between the stowed position and the deployed position.

One disadvantage of the fixed pivot design is that a corner with a large radius is required at the proximal end of the armrest to allow for pivotal movement of the armrest between the stowed and deployed positions without the proximal end interfering with the seat back. The corner with the large radius, however, results in a clearance gap between the proximal end of the armrest and the seat back when the armrest is in the stowed position. This clearance gap is unsightly and therefore undesirable in modern automotive vehicles.

To minimize the clearance gap, it is common to provide a four-bar linkage for connecting an armrest to a seat back. The four-bar linkage allows the armrest to follow a path of movement between a stowed position and a deployed position such that a proximal end of the armrest does not interfere with the seat back.

Several disadvantages of the four-bar linkage design are that it is complicated, costly, includes multiple parts, and is prone to buzz, squeak, and rattle issues. Consequently, it is desirable to provide a simplified mechanism for moving an armrest coupled to a seat back between a stowed position and a deployed position such that a proximal end of the armrest does not interfere with the seat back. It is also desirable that the armrest has a radius at the proximal end that is sufficiently small such that when the armrest is in the stowed position only a small gap is created between the proximal end and the seat back.

SUMMARY OF THE INVENTION

According to one aspect of the invention, an armrest assembly comprises an armrest extending between a proximal end and an opposite distal end and movable between a generally vertical stowed position and a generally horizontal deployed position. A bracket includes a slot having a first angled portion connected with a second generally vertical portion, said second generally vertical portion connected with a third arcuate portion. First and second pins extend laterally from the proximal end of the armrest. The first and second pins are pivotally and slidably coupled to the slot, wherein the first pin travels along the first angled portion of the slot and the second pin travels along the second generally vertical portion of the slot in response to pivotal movement of the armrest, thereby lifting the armrest, and wherein the first pin remains at the transition between the first angled portion and the second generally vertical portion of the slot and the second pin travels along the third arcuate portion in response to further pivotal movement of the armrest between the stowed position and the deployed position.

According to another aspect of the invention, a seat assembly for an automotive vehicle comprises a seat back including a recess formed therein. An armrest extends between a proximal end operatively coupled to the seat back and an opposite distal end. The armrest is movable between a generally vertical stowed position disposed within the recess and a generally horizontal deployed position with the distal end extending from the seat back. A bracket is fixedly secured to the seat back and includes a slot having a first angled portion extending from a first closed end to a second portion, the second portion extending generally vertically to a third arcuate portion, and the third arcuate portion extending to a second closed end. First and second pins extend laterally from said proximal end of the armrest. The first and second pins are pivotally and slidably coupled to the slot, wherein the first pin is disposed at the first closed end of the first angled portion and the second pin is disposed at the transition between the first angled portion and the second portion when the armrest is in the stowed position, and wherein the first pin is disposed at the transition between the first angled portion and the second portion and the second pin is disposed at the second closed end of the third arcuate portion when the armrest is in the deployed position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figures 1, 1A, 2:
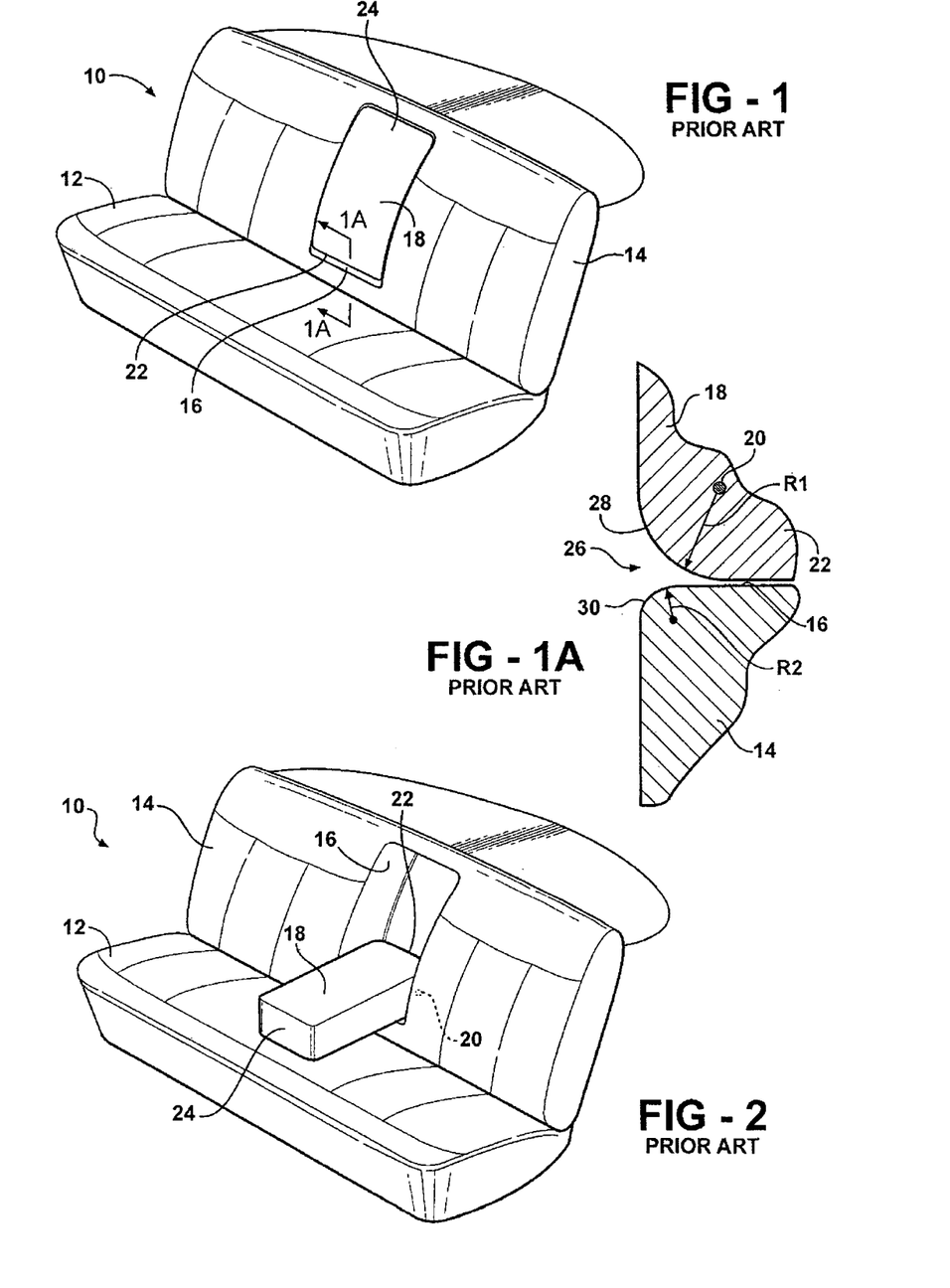
FIG. 1 is a perspective view a bench-type seat assembly for an automotive vehicle illustrating a center armrest in a stowed position according to the prior art.
FIG. 1A is a cross-sectional view taken along line 1A-1A of FIG. 1.
FIG. 2 is a perspective view of the seat assembly of FIG. 1 illustrating the prior art armrest in a deployed position.

Referring to FIGS. 1 through 2, a conventional bench-type seat assembly for an automotive vehicle is generally shown at 10. The seat assembly 10 includes a seat cushion 12 and a seat back 14. The construction of the seat cushion 12 includes a seat cushion frame for supporting a contoured foam pad encased by a trim cover. Similarly, the seat back 14 includes a seat back frame for supporting a contoured foam pad encased by a trim cover. A pocket or recess 16 is formed in the seat back 14 for receiving an armrest 18 therein. In the prior art, the armrest 18 is pivotally coupled to the seat back 14 about a fixed pivot 20 for pivoting the armrest 18 between a generally vertical stowed position and a generally horizontal deployed position. The armrest 18 extends between a proximal end 22 pivotally coupled at the fixed pivot 20 and an opposite distal end 24. In order to pivot the armrest 18 about the fixed pivot 20 between the stowed position and the deployed position, a relatively large clearance gap 26 is necessary between the proximal end 22 of the armrest 18 and the seat back 14 to prevent binding or interference between the armrest 18 and the seat back 14. More specifically, the large clearance gap 26 is needed to allow the armrest 18 to pivot about the fixed pivot 20 without a lower front corner 28 of the armrest 18 binding against a lower front corner 30 of the seat back 14. The large clearance gap 26 is a result of the seat trim outline at the lower front corner 28 of the armrest 18 having a first large radius R1 and the seat trim outline at the lower front corner 30 of the seat back 14 having a second large radius R2. The large clearance gap 26 creates an unsightly and undesirable appearance when the armrest 18 is in the stowed position.

Referring to FIGS. 3 through 7, a bench-type seat assembly 110 includes an armrest 118 according to one embodiment of the present invention. The seat assembly 110 includes a seat cushion 112 and a seat back 114. The construction of the seat cushion 112 includes a seat cushion frame for supporting a contoured foam pad encased by a trim cover. Similarly, the seat back 114 includes a seat back frame for supporting a contoured foam pad encased by a trim cover. A pocket or recess 116 is formed in the seat back 114 for receiving the armrest 118 therein.

Figures 3, 3A, 4:
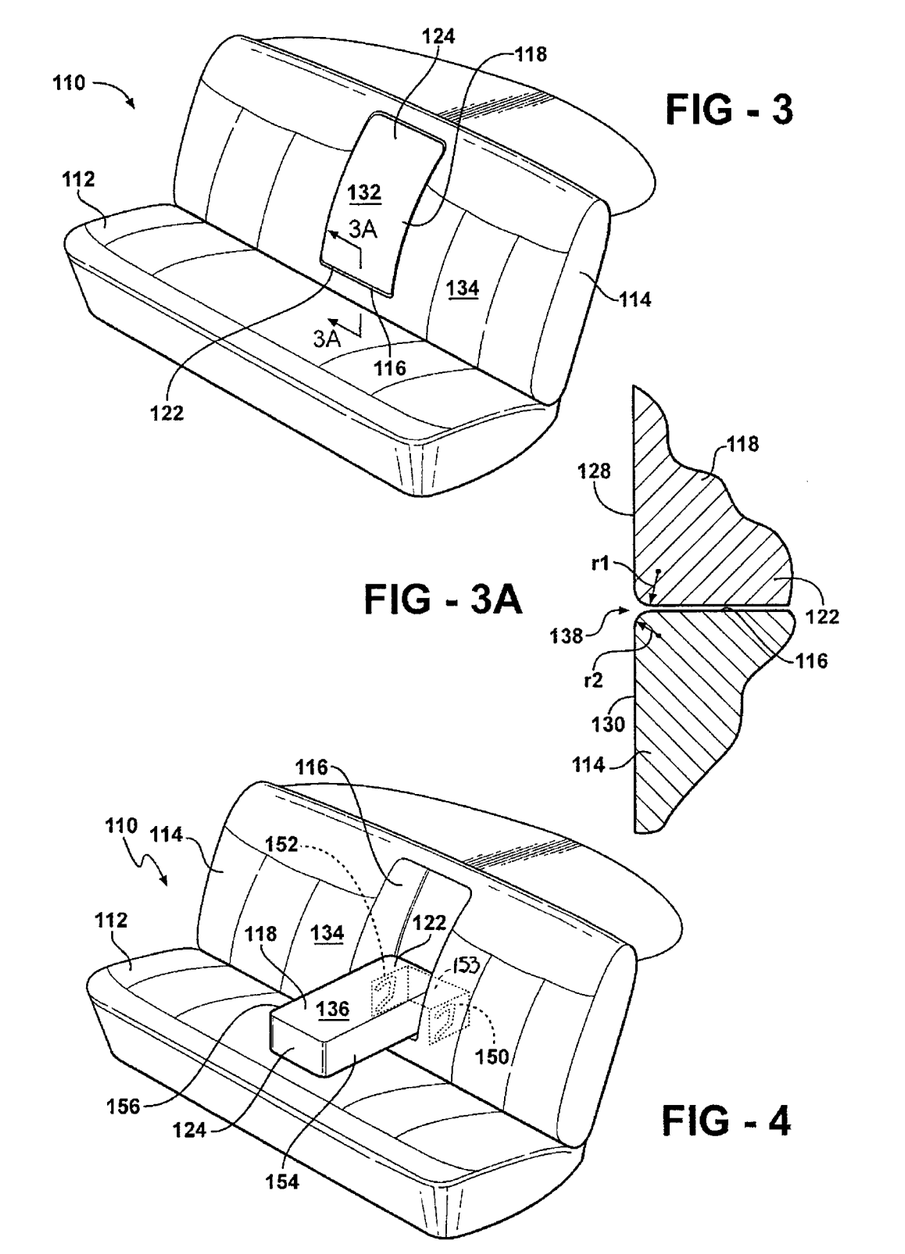
FIG. 3 is a perspective view of a seat assembly for an automotive vehicle illustrating a center armrest in a stowed position according to a first embodiment of the invention.
FIG. 3A is a cross-sectional view taken along line 3A-3A of FIG. 3.
FIG. 4 is a perspective view of the seat assembly of FIG. 3 illustrating the center armrest in a deployed position.

In FIG. 3, the armrest 118 is shown in a generally vertical non-use or stowed position disposed within the recess 116 in the seat back 114. In the stowed position, an underside 132 of the armrest 118 is flush with a seating surface 134 of the seat back 114. In FIG. 4, the armrest 118 is shown in a generally horizontal use or deployed position with a distal end 124 of the armrest 118 extending from the seat back 114. In the deployed position, a top side or use surface 136 of the armrest 118 is facing upward to provide support for an occupant's arm.

When the armrest 118 is in the stowed position, a relatively small clearance gap 138 is apparent between a proximal end 122 of the armrest 118 and the seat back 114. In the present invention only the small clearance gap 138 is needed to allow the armrest 118 to move between the stowed and deployed positions without a lower front corner 128 of the armrest 118 binding against or interfering with a lower front corner 130 of the seat back 114. The small clearance gap 138 is a result of the seat trim outline at the lower front corner 128 of the armrest 118 having a first small radius r1 and the seat trim outline at the lower front corner 130 of the seat back 114 having a second small radius r2. The small clearance gap 138 creates an improved appearance when the armrest 118 is in the stowed position in comparison with the prior art.

It is noted, however, that due to the small clearance gap 138 the armrest 118 cannot pivot about a fixed pivot between the stowed and deployed positions, as disclosed in the prior art, because the lower front corner 128 of the armrest 118 will bind against or interfere with the lower front corner 130 of the seat back 114. Therefore, a coupling mechanism, generally shown at 140, is provided to enable movement of the armrest 118 between the stowed and deployed positions without binding or interference between the lower front corner 128 of the armrest 118 and the lower front corner 130 of the seat back 114. The coupling mechanism 140 includes a generally U-shaped bracket 142 and spaced apart first 144 and second 146 pins that operatively couple the armrest 118 and the seat back 114 together.

Referring to FIGS. 4 through 7, the bracket 142 is disposed within and fixedly secured to the seat back 114 adjacent a lower end 148 of the recess 116. The bracket 142 is oriented such that the open portion of the generally U-shaped bracket 142 corresponds with the opening of the recess 116. The bracket 142 includes a first side flange 150 and a second side flange 152 extending from a back plate 153 and adapted to receive the proximal end 122 of the armrest 118 therebetween. The first side flange 150 corresponds with a first side 154 of the armrest 118 and the second side flange 152 corresponds with a second side 156 of the armrest 118. Each of the first 150 and second 152 side flanges includes a slot 158 for guiding the armrest 118 between the stowed position and the deployed position. Both of the first 144 and second 146 pins extend laterally through the proximal end 122 of the armrest 118 and protrude outwardly from the first 154 and second 156 sides thereof. The ends of the first 144 and second 146 pins protruding from the first side 154 of the armrest 118 are pivotally and slidably coupled with the slot 158 in the first side flange 150 of the bracket 142. Similarly, the ends of the first 144 and second 146 pins protruding from the second side 156 of the armrest 118 are pivotally and slidably coupled with the slot 158 in the second side flange 152 of the bracket 142. Each one of the slots 158 includes a first angled portion 160 connected to a second generally vertical portion 162, which in turn is connected to a third arcuate portion 164. More specifically, the first angled portion 160 extends from a first closed end 166 upwardly and rearwardly to the second generally vertical portion 162, which extends upwardly to the third arcuate portion 164, which in turn extends forwardly and downwardly to a second closed end 168.

Figure 5:
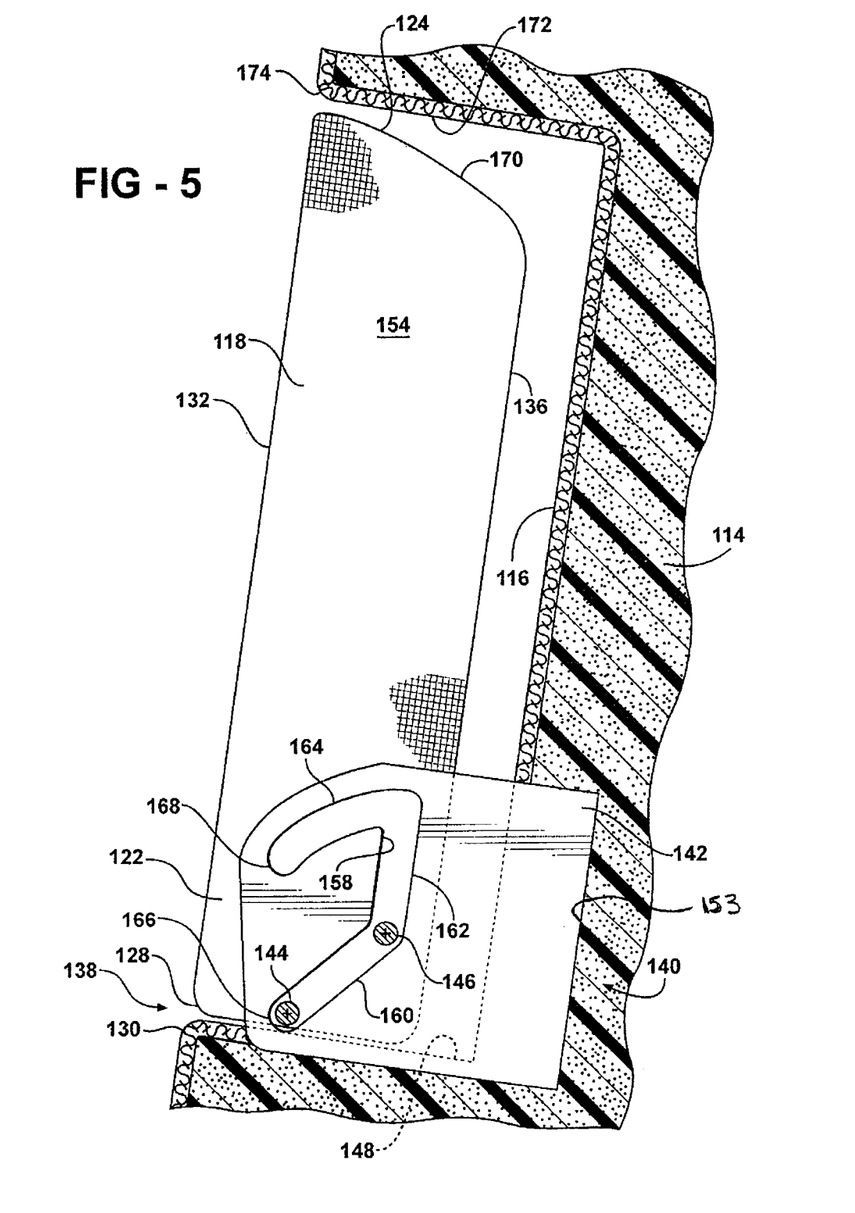
FIG. 5 is a fragmentary, cross-sectional side view of the seat assembly of FIG. 3 illustrating the center armrest in the stowed position.

In operation, the armrest 118 begins in the stowed position, shown in FIG. 5. When the armrest 118 is in the stowed position the first pin 144 is disposed at the first closed end 166 of the first angled portion 160 and the second pin 146 is disposed at the transition between the first angled portion 160 and the second generally vertical portion 162. The armrest 118 is urged to move from the stowed position to the deployed position by pulling the distal end 124 of the armrest 118 outward, away from the seating surface 134 of the seat back 114. As the armrest 118 moves from the stowed position toward the deployed position, the first pin 144 travels upwardly and rearwardly along the first angled portion 160 and the second pin 146 travels upwardly along the second generally vertical portion 162, thereby lifting the proximal end 122 of the armrest 118 to prevent contact between the lower front corner 128 of the armrest 118 and the lower front corner 130 of the seat back 114 while simultaneously pivoting the armrest 118 in a counterclockwise direction (when viewed from FIGS. 5 and 6). It is noted that although the initial pivotal movement of the armrest 118 is coupled with lifting or an upward movement of the armrest 118, the distal end 124 of the armrest 118 has a slight taper 170 that allows this upward movement without the distal end 124 binding against an upper end 172 of the recess 116. Additionally, the distal end 124 of the armrest 118 and the upper end 172 of the recess 116 are typically compressible, which allows the armrest 118 to pass by the seat trim outline at an upper front corner 174 of the seat back 114. The distal end 124 of the armrest 118 may rub slightly against the upper front corner 174 of the seat back 114, but not enough to hinder the pivotal movement of the armrest 118.

Figure 6:
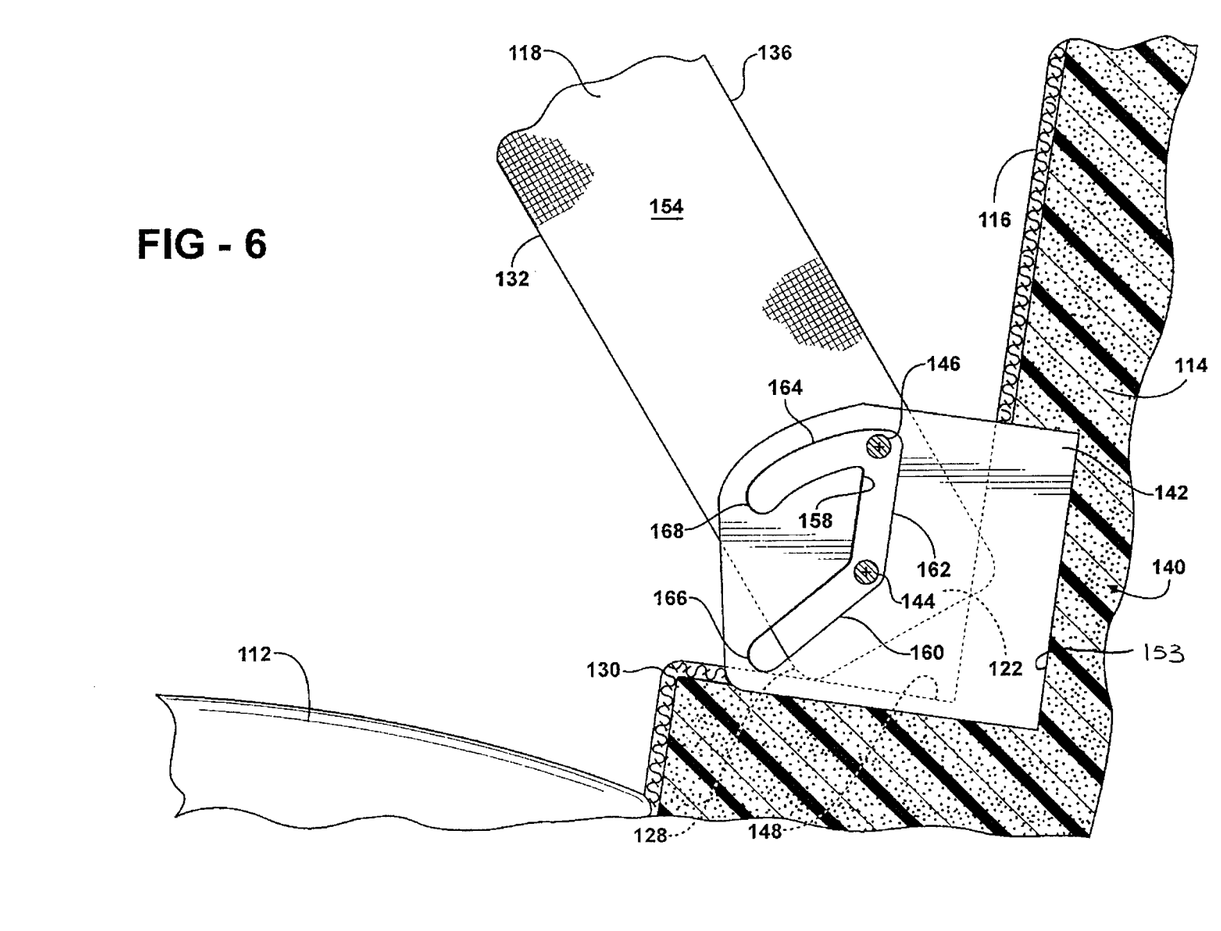
FIG. 6 is a fragmentary, cross-sectional side view of the seat assembly of FIG. 3 illustrating the center armrest in a position midway between the stowed position and the deployed position.
Figure 7:
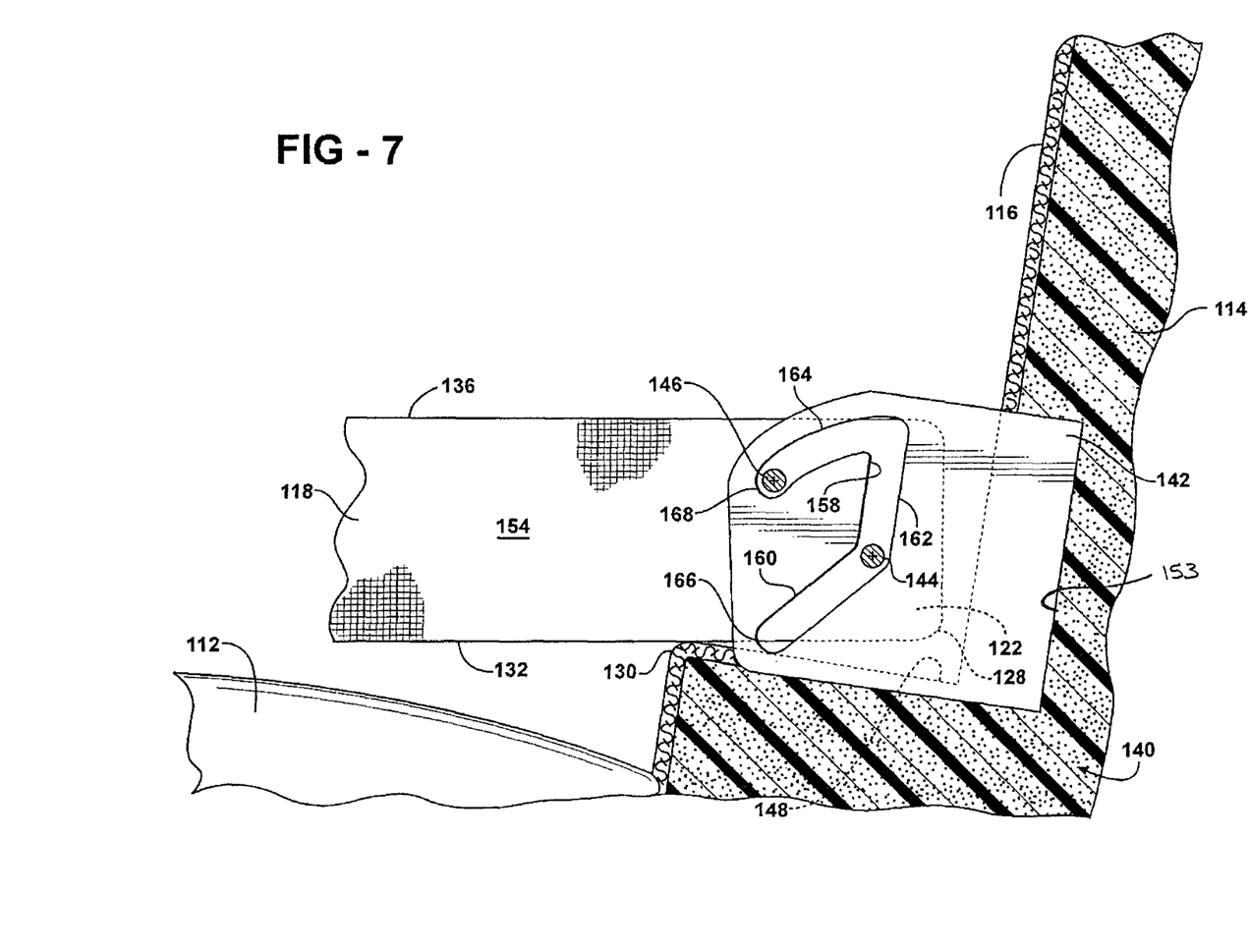
FIG. 7 is a fragmentary, cross-sectional side view of the seat assembly of FIG. 4 illustrating the center armrest in the deployed position.

The armrest 118 is in an intermediate position, shown in FIG. 6, between the stowed and deployed positions when the first pin 144 is disposed at the transition between the first angled portion 160 and the second generally vertical portion 162 and the second pin 146 is disposed at the transition between the second generally vertical portion 162 and the third arcuate portion 164. As the armrest 118 continues to move toward the deployed position the first pin 144 remains at the transition between the first angled portion 160 and the second generally vertical portion 162. The armrest 118 pivots about the first pin 144 and the second pin 146 travels forwardly and downwardly along the third arcuate portion 164. When the armrest 118 is in the deployed position, shown in FIG. 7, the first pin 144 is disposed at the transition between the first angled portion 160 and the second generally vertical portion 162 and the second pin 146 is disposed at the second closed end 168 of the third arcuate portion 164.

It is contemplated that the third arcuate portion 164 could include a plurality of detents (not shown) disposed therealong for positively engaging the second pin 146 to define any number of intermediate positions of the armrest 118 between the stowed position and the deployed position. It is further contemplated that any number of changes could be made to the U-shaped bracket 142 depending on the desired positioning of the stowed and deployed positions of the armrest 118 and the desired movement of the armrest 118 between the stowed and deployed positions. For example, the shape, length, position, and orientation of each of the first angled portion 160, the second generally vertical portion 162, and the third arcuate portion 164 could be changed without varying from the scope of the invention. Further still, it is contemplated that the present invention could be incorporated into any number of applications in which a four-bar linkage is typically used to actuate a closure, such as hood and trunk hinges, door hinges, home furnishing applications, etc. In such applications it is often desirable to provide the closure with a lifting movement and a pivoting movement.

Figure 8:
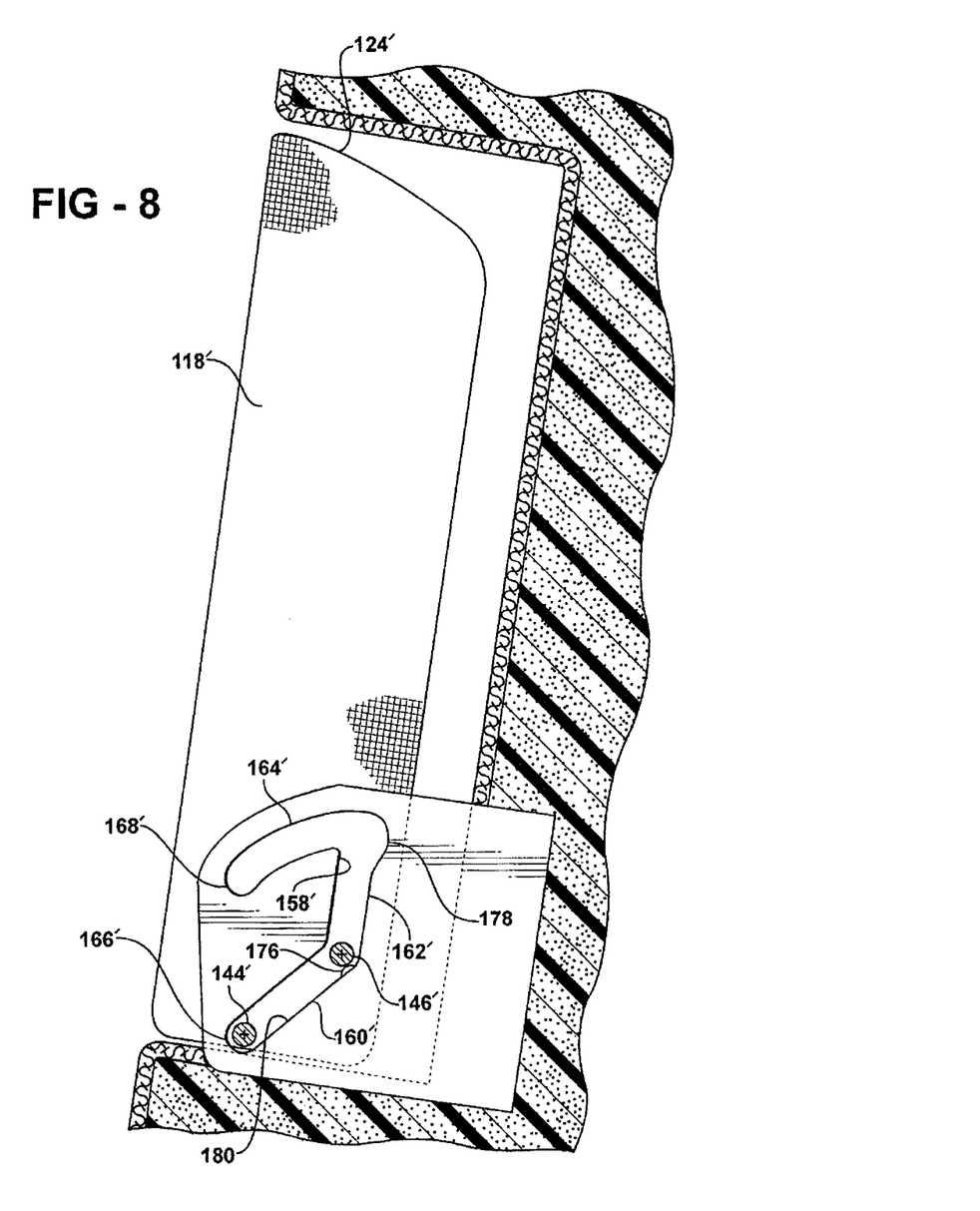
FIG. 8 is a fragmentary, cross-sectional side view of a seat assembly illustrating a center armrest in a stowed position according to a second embodiment of the invention.
Figure 9:
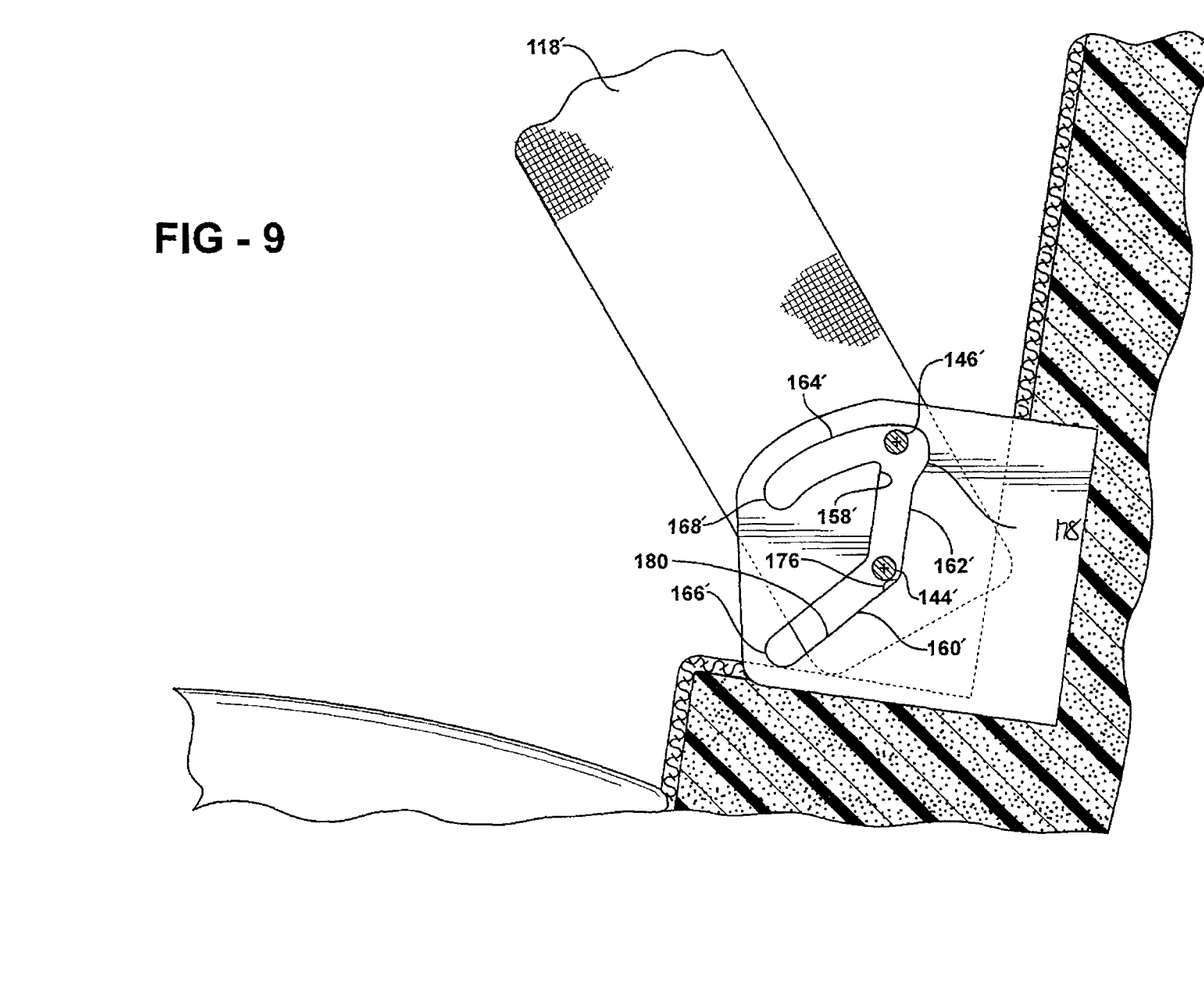
FIG. 9 is a fragmentary, cross-sectional side view of the seat assembly of FIG. 8 illustrating the center armrest in a position midway between the stowed position and a deployed position.
Figure 10:
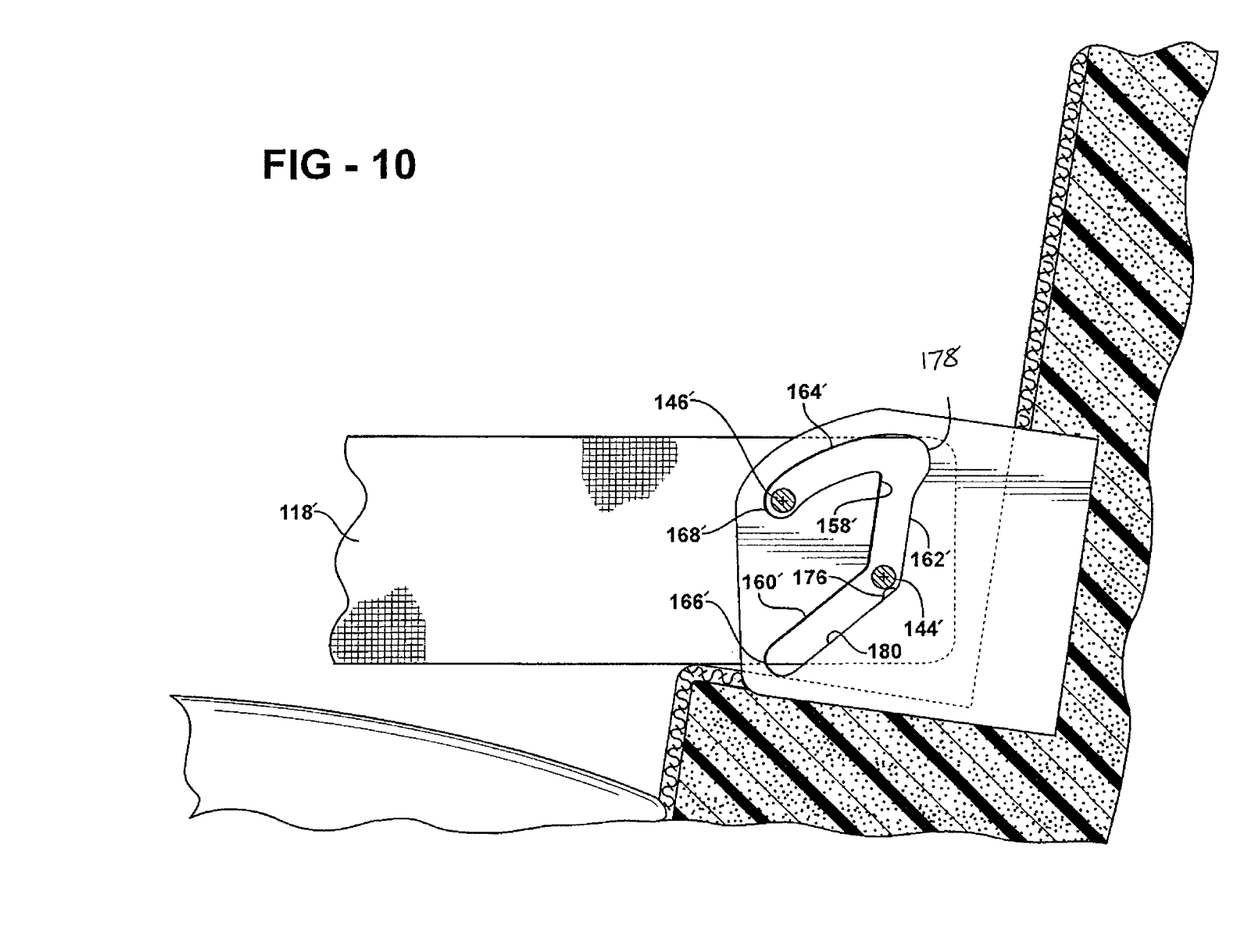
FIG. 10 is a fragmentary, cross-sectional side view of the seat assembly of FIG. 9 illustrating the center armrest in the deployed position.

Referring to FIGS. 8-10, wherein like primed reference numerals represent similar elements as those described above, in a second embodiment of the invention the slot 158' includes a detent 176 and a profile relief 178. The detent 176 is disposed within the slot 158' adjacent the transition between the first angled portion 160' and the second generally vertical portion 162'. More specifically, the detent 176 is positioned along a rearward surface 180 of the first angled portion 160' and is adapted for positively engaging the first pin 144' when the armrest 118' moves between the deployed position and the intermediate position. When the armrest 118' moves from the deployed position toward the intermediate position the detent 176 positively engages the first pin 144' assuring that the first pin 144' does not slide down the first angled portion 160' of the slot 158' prior to the second pin 146' reaching the transition between the second generally vertical portion 162' and the third arcuate portion 164'. One or both of the detent 176 and the first pin 144' may be compliant to allow the first pin 144' to pass-by as the armrest 118' is moved between the intermediate position and the stowed position. For example, the detent 176 can be made of nylon or some other type of compliant material. Similarly, the first pin 144' may include a surrounding bushing made of nylon or some other type of compliant material.

The profile relief 178 is an enlargement of the slot 158'. More specifically, the profile relief 178 enlarges the second generally vertical portion 162' of the slot 158' adjacent the transition between the second generally vertical portion 162' and the third arcuate portion 164' in a rearward direction. The profile relief 178 is provided to allow the armrest 118' to operate smoothly between the stowed position and the deployed position.

In operation, beginning with the armrest 118' in the deployed position, shown in FIG. 10, the first pin 144' is disposed at the transition between the first angled portion 160' and the second generally vertical portion 162' and the second pin 146' is disposed at the second closed end 168' of the third arcuate portion 164'. Additionally, when the armrest 118' is in the deployed position, the detent 176 is positively engaged with and supports the first pin 144'. The armrest 118' is urged to move from the deployed position to the stowed position by lifting the distal end 124' of the armrest 118'. As the armrest 118' moves from the deployed position toward the stowed position, the detent 176 continues to positively engage the first pin 144' to ensure the first pin 144' remains at the transition between the first angled portion 160' and the second generally vertical portion 162'. The armrest 118' pivots about the first pin 144' and the second pin 146' travels rearwardly and upwardly along the third arcuate portion 164'.

The detent 176 continues to positively engage the first pin 144' when the armrest 118' is in the intermediate position, shown in FIG. 9. When the armrest 118' is in the intermediate position, the first pin 144' is disposed at the transition between the first angled portion 160' and the second generally vertical portion 162' and the second pin 146' is disposed at the transition between the second generally vertical portion 162' and the third arcuate portion 164'. As the armrest 118' continues to move toward the stowed position the first pin 144' moves past the detent 176 and the second pin 146' enters the relief profile 178. The first pin 144' slides down the first angled portion 160' and the second pin 146' slides down the second generally vertical portion 162' until the armrest 118' is in the stowed position. When the armrest 118' is in the stowed position, shown in FIG. 8, the first pin 144' is disposed at the first closed end 166' of the first angled portion 160' and the second pin 146' is disposed at the transition between the first angled portion 160' and the second generally vertical portion 162'.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:
1. An armrest assembly comprising:
  an armrest extending between a proximal end and an opposite distal end, said armrest movable between a generally vertical stowed position and a generally horizontal deployed position;

a bracket including a slot having a first angled portion connected with a second generally vertical portion, said second generally vertical portion connected with a third arcuate portion; and first and second pins extending laterally from said proximal end of said armrest, said first and second pins pivotally and slidably coupled to said slot, wherein said first pin travels along said first angled portion of said slot and said second pin travels along said second generally vertical portion of said slot in response to pivotal movement of said armrest, thereby lifting said armrest, and wherein said first pin remains at the transition between said first angled portion and said second generally vertical portion of said slot and said second pin travels along said third arcuate portion in response to further pivotal movement of said armrest between said stowed position and said deployed position.

2. An armrest assembly as set forth in claim 1 wherein said first angled portion of said slot extends from a first closed end to said second vertical portion and said third arcuate portion of said slot extends from said second vertical portion to a second closed end.

3. An armrest assembly as set forth in claim 2 wherein said first pin is disposed at said first closed end of said first angled portion of said slot and said second pin is spaced apart from said first pin and disposed at the transition between said first angle portion and said second vertical portion when said armrest is in said stowed position.

4. An armrest assembly as set forth in claim 3 wherein said first pin is disposed at the transition between said first angled portion and said second vertical portion and said second pin is disposed at said second closed end of said third arcuate portion when said armrest is in said deployed position.

5. An armrest assembly as set forth in claim 4 wherein said first pin is disposed at the transition between said first angled portion and said second vertical portion and said second pin is disposed at the transition between said second portion and said third arcuate portion thereby defining an intermediate position of said armrest between said stowed and deployed positions.

6. An armrest assembly as set forth in claim 5 wherein said bracket is U-shaped and includes spaced apart and parallel first and second side flanges extending perpendicular from a back plate and wherein said slot is formed in each of said first and second side flanges.

7. An armrest assembly as set forth in claim 6 wherein said proximal end of said armrest is disposed within said bracket between said first and second side flanges, said armrest including a first side adjacent to said first side flange and a second side adjacent to said second side flange.

8. An armrest assembly as set forth in claim 7 wherein said first angled portion of said slot includes a raised detent adjacent to the transition between said first angled portion and said second vertical portion for engaging and supporting said first pin when said armrest is in said intermediate and deployed positions.

9. An armrest assembly as set forth in claim 8 wherein at least one of said detent and said first pin is compliant to allow said first pin to travel along said slot and over said detent between said stowed and deployed positions.

10. An armrest assembly as set forth in claim 9 wherein said second vertical portion of said slot includes a enlarged profile relief adjacent to the transition between said second vertical portion and said third arcuate portion for allowing said second pin to slide therebetween.

11. A seat assembly for an automotive vehicle, said seat assembly comprising:
a seat back including a recess formed therein;
an armrest extending between a proximal end operatively coupled to said seat back and an opposite distal end, said armrest movable between a generally vertical stowed position disposed within said recess and a generally horizontal deployed position with said distal end extending from said seat back;
a bracket fixedly secured to said seat back, said bracket including a slot having a first angled portion extending from a first closed end to a second portion, said second portion extending generally vertically to a third arcuate portion, said third arcuate portion extending to a second closed end; and
first and second pins extending laterally from said proximal end of said armrest, said first and second pins pivotally and slidably coupled to said slot, wherein said first pin is disposed at said first closed end of said first angled portion and said second pin is disposed at the transition between said first angled portion and said second portion when said armrest is in said stowed position, and wherein said first pin is disposed at the transition between said first angled portion and said second portion and said second pin is disposed at said second closed end of said third arcuate portion when said armrest is in said deployed position.

12. An armrest assembly as set forth in claim 11 wherein said first pin is disposed at the transition between said first angled portion and said second vertical portion and said second pin is disposed at the transition between said second portion and said third arcuate portion thereby defining an intermediate position of said armrest between said stowed and deployed positions.

13. An armrest assembly as set forth in claim 12 wherein said bracket is U-shaped and includes spaced apart and parallel first and second side flanges extending perpendicular from a back plate and wherein said slot is formed in each of said first and second side flanges.

14. An armrest assembly as set forth in claim 13 wherein said proximal end of said armrest is disposed within said bracket between said first and second side flanges, said armrest including a first side adjacent to said first side flange and a second side adjacent to said second side flange.

15. An armrest assembly as set forth in claim 14 wherein said first angled portion of said slot includes a raised detent adjacent to the transition between said first angled portion and said second vertical portion for engaging and supporting said first pin when said armrest is in said intermediate and deployed positions.

16. An armrest assembly as set forth in claim 15 wherein at least one of said detent and said first pin is compliant to allow said first pin to travel along said slot and over said detent between said stowed and deployed positions.

17. An armrest assembly as set forth in claim 16 wherein said second vertical portion of said slot includes a enlarged profile relief adjacent to the transition between said second vertical portion and said third arcuate portion for allowing said second pin to slide therebetween.

* * * * *